United States Patent [19]

Zahuranec

[11] Patent Number: 4,826,218
[45] Date of Patent: May 2, 1989

[54] COUPLING DEVICE FOR HEAVY-WALLED TUBULAR MEMBERS

[75] Inventor: Emery J. Zahuranec, Cleveland, Ohio

[73] Assignee: Crawford Fitting Co., Solon, Ohio

[21] Appl. No.: 131,220

[22] Filed: Dec. 10, 1987

[51] Int. Cl.⁴ ............................................ F16L 19/08
[52] U.S. Cl. ................................. 285/342; 285/382.7
[58] Field of Search .................... 285/382.7, 341, 342, 285/343

[56] References Cited

U.S. PATENT DOCUMENTS

| | | | |
|---|---|---|---|
| 2,484,815 | 10/1949 | Crawford | 285/122 |
| 2,749,152 | 6/1956 | Courtot | 285/342 |
| 3,075,793 | 1/1963 | Lennon et al. | 285/342 |
| 3,103,373 | 9/1963 | Lennon et al. | 285/342 |
| 3,215,457 | 11/1965 | Teeters | 285/382.7 X |
| 3,584,900 | 6/1971 | Lennon et al. | 285/341 |

Primary Examiner—Dave W. Arola
Attorney, Agent, or Firm—Fay, Sharpe, Beall, Fagan, Minnich & McKee

[57] ABSTRACT

A gripping and sealing or coupling device particularly useful for heavy-walled tubular members includes a body member having first and second counterbores cooperatively receiving first and second ferrules therein. Radial expansion of the first ferrule on makeup of the device is limited by radially dimensioning the first counterbore so that it is substantially less than a minor diameter of the threads of an associated coupling nut or on the coupling body. The holding forces of the ferrules is enhanced by limiting radial deformation while disassembly and reassembly of a coupling arrangement is readily facilitated.

3 Claims, 1 Drawing Sheet

COUPLING DEVICE FOR HEAVY-WALLED TUBULAR MEMBERS

BACKGROUND OF THE INVENTION

This invention pertains to the art of coupling devices and more particularly to an improved controlled phase sequential sealing and gripping device.

The invention is particularly applicable to a tube coupling arrangement and will be described with particular reference thereto. However, it will be appreciated that the invention has broader applications and may be advantageously employed for other uses in a variety of environments.

The general environment of the present invention is set forth in a series of patents beginning with U.S. Pat. No. 2,484,815 issued Oct. 18, 1949 and incorporated herein by reference. Shown and described in this patent is the basic structure for a tube coupling arrangement employing first and second ferrules captured between a coupling nut and a coupling body, and which are deformed into sealing and gripping engagement with a tubular member received through the ferrules into the coupling body. A female coupling nut is received over an externally threaded region of the coupling body, and when advanced relative to the coupling body, provides the force necessary to deform the ferrules into gripping and sealing relationship with the tubular member. A predetermined relationship of the pitch and thread in the threaded cooperation between these two components is provided. That is, the nature of the threaded cooperation between the coupling body and coupling nut is such that it provides for controlled deformation of the ferrules after finger-tight makeup to a final sealing and gripping position on the tubular member.

Further refinements of this sequential gripping arrangement are set forth in U.S. Pat. Nos. 3,075,793 issued Jan. 29, 1963 to Lennon, et al. and 3,103,373 issued Sept. 10, 1963 to Lennon, et al. The disclosures of both of these patents are also incorporated herein by reference. Although the latter patents are directed to refinements of the concept disclosed in U.S. Pat. No. 2,484,815, the general intent and purpose is essentially unchanged. That is, once the coupling nut has been brought to a finger-tight conditionon t eh coupling body, a predetermined amount of further nut advancement produces axial compressive forces on the ferrules relative to the coupling body and a corresponding deformation of the ferrules into gripping and sealing relationship with the tubular member. At the same time, a first ferrule is driven into sealing engagement with the coupling body.

As illustrated in the foregoing prior patents, first and second counterbores were employed to receive the front and back ferrules, respectively, around the tubular member. The counterbore arrangements were designed and dimensioned so that a rear shoulder of the coupling nut indirectly transferred axial forces to the front ferrule through abutting engagement with the rear ferrule. Predetermined cooperating thread parameters between the coupling body and coupling nut were utilized for various fitting sizes to achieve the desired coupling results. For example, the prior arrangement utilized a ⅜" thread in a one-half inch fitting.

While the couplings disclosed in the above referenced three patents have enjoyed substantial commercial success, it has been observed that increasing the sidewall thickness of the tubing to be coupled has a tendency to produce deformation of the front ferrule radially outwardly to a greater extent than with a tubular member of lesser wall thickness. Because of the greater resistance to radial compressive forces offered by heavy-walled tubular members, the axial force transferred through the rear ferrule has a tendency to deform the front ferrule radially outwardly to such an extend that it may interfere wit the threaded portion of the coupling nut. Such radially outward expansion may thus render disassembly of the fitting extremely difficult, if not impossible. In such a case, it may not be possible to pass the threads on the coupling nut over the deformed front ferrule to achieve complete disassembly.

As a result of the above described circumstances, it has been considered desirable to provide a fitting arrangement that can be utilized with heavy-walled tubular members without encountering the potential for disassembly problems of the type noted. The subject invention meets these needs and others, and provides a coupling device which has increased effectiveness for heavy-walled tubing applications.

SUMMARY OF THE INVENTION

According to the present invention, an improved coupling device is provided that positively limits radially outward deformation of a ferrule during final coupling makeup.

According to a more detailed aspect of the invention, a coupling body has an axial through opening or bore wherein a portion thereof is adapted to receive an end section of a tubular member. An internal tapered camming surface on the coupling body cooperatively receives a tapered external surface of a first ferrule. A second ferrule operatively engages the first ferrule and transfers thereto makeup forces from a coupling nut. The coupling nut receives the tubular member therethrough and employs first and second counterbores to receive the first and second ferrules. The counterbore receiving the first ferrule is diametrically dimensioned to be substantially less than a preselected threaded region on the coupling nut. This dimensional relationship assures that any radially outward expansion of the ferrule is sufficiently limited to readily facilitate disassembly and reassembly of the device.

According to a more limited aspect of the invention, the coupling nut comprises a male coupling member having an externally threaded region spaced axially and radially outward from the first counterbore.

A principal advantage of the invention resides in limiting radial expansion of a first or front ferrule on coupling makeup to prevent any potential for interference with dissassembly and reassembly of the coupling device.

Another advantage of the invention s provided by the direct or increased transfer of forces from the coupling nut to the ferrule arrangement to more tightly grip and hold the external surface of the heavy-walled tubular member.

Yet another advantage is realized in additional heft due to use of a larger diameter thread in the coupling arrangement to thereby provide more resistance to radial expansion of the ferrules and permitting more effective use of a fitting on even heavier-walled tubular members.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Figure 1:
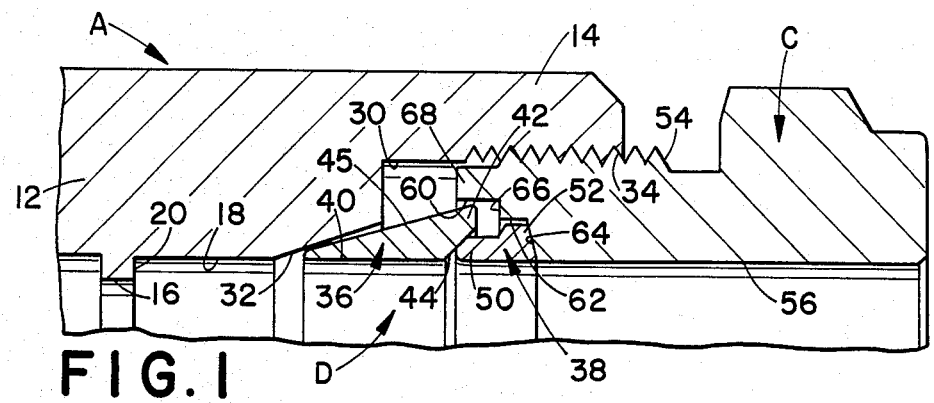
FIG. 1 is a partial side elevational view in cross-section of a coupling device which employs a male coupling nut and with no associated tubular member being shown.

Referring now to the drawings which are provided for purposes of illustrating preferred embodiments of the invention only and not for purposes of limiting the same, the FIGURES show a coupling body A as having an associated tubular member B received therein. Gripping and sealing engagement between the body and tubular member is achieved through use of a coupling nut C and a ferrule arrangement D.

More particularly, the coupling body or member has a first end 12 and a second end 14 axially spaced therefrom. It will be understood that the coupling body may take any number of forms, such as a union, tee, cross, or elbow. The coupling as well may be provided directly on a valve, filter, instrument, or the like. In any case, the coupling body includes an opening or through passage 16 that is generally comparable to the inner diameter of the associated tubular member B.

A first or inner bore 18 coaxial with the through passage 16 defines a radial shoulder 20 against which a first or inner end 22 of the tubular member abuts upon axial insertion into the coupling. A second or outer counterbore 30 coaxial with inner bore 18 is defined adjacent an axially outer end of the coupling body. A tapered camming mouth or surface 32 interconnects the inner bore 18 with the outer bore 30. An interiorly threaded region 34 is defined adjacent the second end 14 of the coupling body, and is coaxial with inner bore 18. As will be described in further detail below, this threaded region cooperates with a coupling nut to effect sealing and gripping engagement of the associated tubular member.

The ferrule arrangement D includes a first or front ferrule 36 and a second or rear ferrule 38. In the original, undeformed conformation, each of the ferrules 36, 38 has an inner diameter dimensioned so as to closely but freely receive the tubular member therethrough. The nose 40 of the front ferrule is adapted for cooperating engagement with the tapered camming surface 32. Likewise, an axially outer end 42 of the front ferrule is adapted for abutting engagement with the rear ferrule 38 as will be described below. The exterior of the front ferrule also provides a generally tapered or frusto-conical surface 45 having a taper angle somewhat less than that of the camming surface 32 so as to promote driving of the front ferrule into gripping and sealing engagement with the tubular member B. The axially outer end of the front ferrule includes a frusto-conical or tapered shoulder 44 adapted for abutting, driving cooperation with an axially inner end 50 of the rear ferrule. An enlarged, stepped portion 52 of the rear ferrule is adapted for axial engagement by shoulder 64 on coupling nut C.

Figure 2:
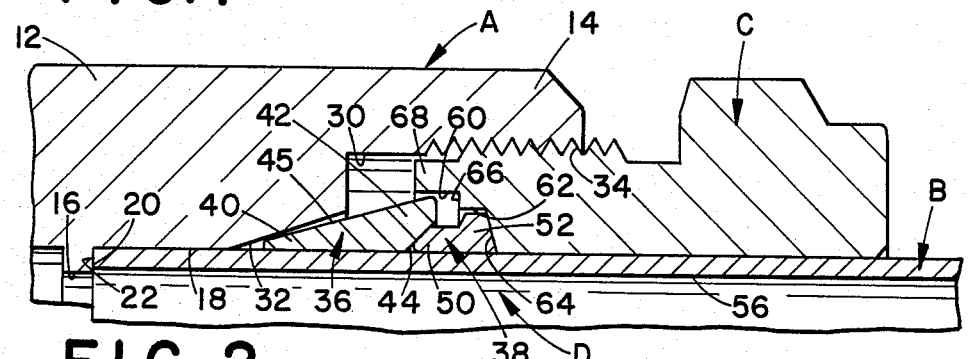
FIG. 2 is a view similar to FIG. 1 with a tubular member inserted into the coupling and with the coupling components made up to a finger-tight relationship.
Figure 3:
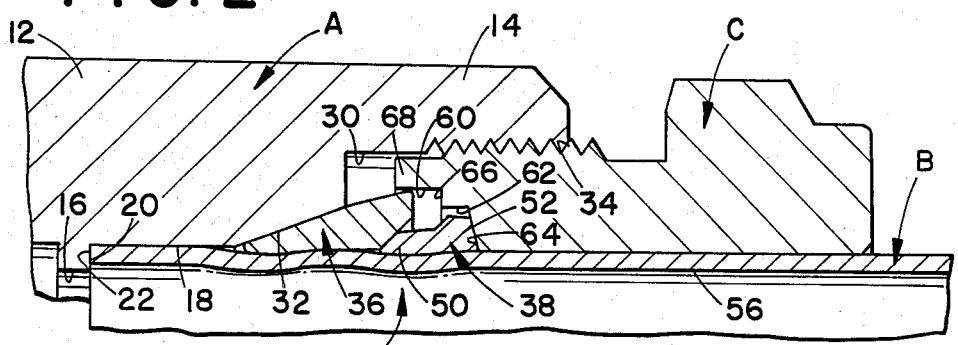
FIG. 3 is also similar to FIG. 1 and shows final makeup of the coupling with the ferrules gripping and sealing the external surface of the associated tubular member; and, FIG. 4 is a cross-sectional, fragmentary view in enlarged scale of a female coupling nut formed according to the subject invention.

According to the preferred embodiment of the subject invention shown in FIGS. 1-3, the coupling nut comprises a male nut having an externally threaded region 54 disposed adjacent the inner end thereof. The coupling nut cooperates with the threaded region 34 of the coupling body and is illustrated in finger-tight relationship in FIGS. 1 and 2. The coupling nut includes a central bore 56 through which the tubular member to be coupled may be passed. The diameter of the bore 56 is substantially the same as the inner diameters of the front an drear ferrules and inner bore 18 of the coupling boy. This facilitates axial insertion of the tubular member into the coupling body prior to initial makeup of the device.

First and second counterbores 60, 62 are generally coaxial with central bore 56 in nut C and receive the outer ends 42, 52 of the front and rear ferrules, respectively. The second counterbore 62 has a diameter intermediate the diameter of the central bore and first counterbore 60. The diameter of the second counterbore is also slightly greater than the outer diameter of the rear ferrule so as to freely receive the same therein. A rear shoulder 64 of the second counterbore generally conforms with the enlarged stepped portion 52 of the rear ferrule. This insures that axial, compressive forces resulting from relative advancement of the coupling nut into the coupling body are adequately transferred to the rear ferrule.

The first counterbore 60 is axially dimensioned so that the rear shoulder 66 thereof never engages the outer end 42 of the front ferrule during final tightening or makeup of the coupling. This assures that the driving forces are transferred from the coupling nut, through the rear ferrule, and to the front ferrule rather than from the coupling nut to the front ferrule directly. The cooperating surfaces and geometry of the various coupling components act to control the gripping and sealing engagement of the ferrules as specifically described in U.S. Pat. Nos. 2,484,815 and 3,103,373. Therefore, a further discussion of this aspect of operation is unnecessary to a full and complete understanding of the subject invention.

As previously noted, a problem would exist with disassembly and reassembly of the prior coupling arrangement, particularly when a heavy-walled tubular member is involved. That is, the front ferrule may undergo some radial expansion during the sequential gripping operation. This expansion is particularly aggravated by the added bulk and rigidity of a heavy-walled tubular member as it opposes forces exerted thereon by the front ferrule. In fact, in the prior art arrangements utilizing heavy-walled tubular members, the outer end 42 of the front ferrule can radially expand to a dimension substantially the same as or greater than the minor diameter dimension of the threaded region of the coupling nut. Under these circumstances, if a female coupling nut is utilized, the front ferrule may interfere with the internal threads and thus prevent removal of the front ferrule therefrom. If a male type coupling nut is utilized, the outer end of the front ferrule can become lodged between the internal threads of the coupling body while retaining ripping engagement with the tubular member. This significantly increases the difficulty of removing the tubular member from the coupling body when disassembly is required.

To overcome these problems, particularly as would be encountered with heavy-walled tubular members, the first counterbore 60 is dimensioned to have a diameter substantially less than the minor diameter of the coupling nut and, likewise, the threaded region of the coupling body. As used herein, the term "minor diameter" refers to the diameter of an imaginary coaxial cylinder that just touches the root of an external thread or the crest of an internal thread as illustrated in the coupling nuts of FIGS. 3 and 4, repectively. The externally threaded nut of FIGS. 1–3 includes a circumferentially continuous flange 68 that extends axially from around the first counterbore and limits radial outward expansion of the rear end of the front ferrule. The rear end of the front ferrule is received in the first counterbore 60 and is adapted for engagement therewith in the vent of radial expansion as illustrated in FIG. 3. This arrangement fully encapsulates the rear of the front ferrule in a radial direction to maintain the nut and coupling body threads free from interference.

Encapsulation of the front ferrule also assures that the rear ferrule deforms to the maximum extend possible into the external surface of the tubular member to realize the exertion of optimum holding power on tubular member B. This is produced by more of the axially imposed forces during final makeup being concentrated into driving the nose of the rear ferrule into the tubular member via the tapered shoulder 44, rather than a portion of the force being directed to radially expanding the front ferrule.

Further, the coupling nut has more bulk than prior arrangements. Accommodating the reduced dimensional relationship of the first counterbore relative to the threads of the coupling nut and coupling body increases the amount of material in the coupling nut itself. For example, where the prior arrangement utilized in ¾" thread on a one-half inch fitting, this new arrangement employs a ⅞" thread on the same size fitting. The increased thread diameter permits machining of the counterbores and retains substantial thickness and heft of the coupling nut to accommodate even heavier-walled tubing than previously considered possible.

Figure 4:
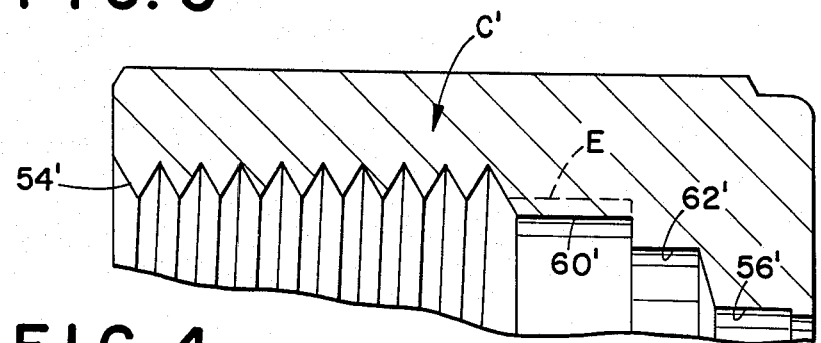

With reference now to FIG. 4, the concept of the subject invention is shown as being equally applicable to a female coupling nut C'. The modified female nut includes an internally threaded region 54' and a central through bore 56'. The first and second counterbores 60', 62' are defined axially adjacent and radially inward from the threaded region. The outer ends of the front and rear ferrules are adatped for receipt in the first and second counterbores, respectively, as described above. More particularly, the first counterbore 60' has a radial dimension substantially less than the minor dimension of the thread 54'. Thus, the area defined between dotted line E and the counterbore 60' is functionally equivalent to the flange 68 on the male coupling nut. This provides even greater material or heft to withstand the radial expansion of the front ferrule as it is deformed into gripping and sealing engagement with the tubular member.

The invention has been described with reference to the preferred embodiments. Obviously, modifications and alterations will occur to others upon a reading and understanding of the specification. It is intended to include all such modifications and alterations insofar as they come within the scope of the appended claims or the equivalents thereof.

Having thus described the invention, it is now claimed:

1. A coupling device adapted for use with an elongated heavy-walled tubular member having a generally cylindrical outer wall, said device comprising:
   a coupling body having an axial opening adapted to receive an associated tubular member, said opening including a generally frusto-conical camming surface tapering radially inward over the axial extent thereof from adjacent the outer end of said opening, said coupling body further including a threaded section extending axially thereof;
   a first generally annular ferrule having a tapered external surface portion cooperatively engagable with said coupling body camming surface, and a tapered internal surface portion;
   a second generally annular ferrule having a tapered external surface at one end for cooperative engagement with the tapered internal surface portion of said first ferrule and a shoulder defined at the other end; and,
   a coupling nut having a threaded region adapted for selective threaded engagement with the threaded section on said coupling body, said coupling nut having a bore extending axially therethrough adapted to closely receive an associated tubular member, and first and second counterbores for receiving said first and second ferrules, respectively, said first counterbore having a cross-sectional dimension substantially less than the minimum cross-sectional dimension of said threaded region for limiting radial expansion of said first ferrule and thereby readily facilitate selective disassembly and reassembly of the device.

2. The device as defined in claim 1 wherein said threaded region is disposed on an external surface of said coupling nut.

3. A coupling device particularly adapted for use with a heavy-walled tubular member, said device comprising:
   a coupling body having a bore first portion adapted to receive an associated heavy-walled tubular member, an enlarged bore second portion axially spaced from said first portion, and a tapering region interconnecting said bore first and second portions, said coupling body further including an internally threaded region adjacent the outer end of said bore second portion;
   a male coupling nut having an externally threaded section adapted for selective threaded engagement with said coupling body threaded region, a passageway extending through said nut adapted to closely receive an associated heavy-walled tubular member, first and second counterbores defined adjacent one end of said passageway with said first counterbore having a diameter substantially less than the minor diameter of said threaded section;
   a first ferrule having a tapered outer conformation dimensioned such that a smaller diameter end thereof is matingly received in said coupling body tapering region and a larger diameter end is received in said first counterbore such that any radially outward expansion of said first ferrule toward said male coupling member threaded section is limited; and,
   a second ferrule engageable with the larger diameter end of said first ferrule and being received in the second counterbore of said coupling nut.

* * * * *